United States Patent [19]

Shen

[11] 3,906,245

[45] Sept. 16, 1975

[54] GRADED JUNCTION VARACTOR FREQUENCY DIVIDER CIRCUITS EMPLOYING LARGE DIVISION FACTORS

[76] Inventor: Michael T. Shen, 8 Place Dargent, Eich, Luxemburg

[22] Filed: Dec. 26, 1973

[21] Appl. No.: 427,719

Related U.S. Application Data

[62] Division of Ser. No. 325,673, Jan. 22, 1973, Pat. No. 3,855,615.

[52] U.S. Cl. .............................. 307/225 R; 307/320

[51] Int. Cl.[2] .................... H03K 23/14; H03K 21/00

[58] Field of Search ........... 307/220, 320, 285, 225; 357/14

[56] References Cited

UNITED STATES PATENTS

| | | | |
|---|---|---|---|
| 2,919,389 | 12/1959 | Heywang et al. | 357/14 |
| 3,163,781 | 12/1964 | Barringer | 307/225 R |
| 3,535,600 | 10/1970 | Engeler | 307/320 X |
| 3,538,446 | 11/1970 | Leonard | 307/220 X |
| 3,581,240 | 5/1971 | Enderby | 307/320 X |
| 3,585,414 | 6/1971 | Ghezzo | 307/320 X |

*Primary Examiner*—Michael J. Lynch
*Assistant Examiner*—L. N. Anagnos
*Attorney, Agent, or Firm*—Arthur L. Plevy

[57] ABSTRACT

A high frequency FM signal is divided by a parametric frequency divider to develop at an output, a low frequency FM signal. The divider includes a graded junction varactor diode and performs divisions in excess of 100 with good linearity. The divided down signal is within an optimum response range for recording or applying the signal to an audio recording means, such as a magnetic tape.

8 Claims, 2 Drawing Figures

PATENTED SEP 16 1975 3,906,245

GRADED JUNCTION VARACTOR FREQUENCY DIVIDER CIRCUITS EMPLOYING LARGE DIVISION FACTORS

This application is a divisional of application Ser. No. 325,673 filed on Jan. 22, 1973 and now U.S. Pat. No. 3,855,615 entitled NOISE REDUCTION APPARATUS EMPLOYING PARAMETRIC FREQUENCY DIVIDERS WITH LARGE DIVISION FACTORS issued on Dec. 17, 1974.

BACKGROUND OF INVENTION

This invention relates to frequency dividers in general, and more particularly to a parametric frequency divider employing large factor division integers to develop a signal which can be recorded and played back at a low frequency on a suitable medium such as a magnetic tape.

Since the advent of the modern recording tape made of mylar and oxide particles and ac bias for improved signal-to-noise ratio, magnetic tape recording has been extensively used both for the consumer industry as well as for broadcasting and professional recording.

Since audio tapes have an optimum response within the range of 2 to 6 KHz, it would be desireable to provide a signal to be impressed upon an audio tape and stored for later playback.

Prior art dividers capable of large division ratios are known, such as multivibrators or cascaded divider chains. These introduce a great deal of phase jitter and phase delay and hence the signal which has been divided down to a lower signal loses much of the information.

It is therefore an object of the present invention to provide a single stage, high division ratio divider, which operates linearly to provide a low frequency signal at the output and within the optimum range for impressing the same on an audio tape.

BRIEF DESCRIPTION OF PREFERRED EMBODIMENT

A frequency divider circuit for dividing an input signal of a given frequency by a large factor comprising of a varactor diode having a first and second terminal and a graded junction therebetween, characterized by a first region of a heavily doped semiconductor material of a given conductivity conductor contiguous with a second region of a lighter doped semiconductor material of opposite conductivity defining a central region contiguous at one end with a third region of a semiconductor material of same conductivity as said central region and an impurity doping level approaching that of said first region, said varactor diode exhibiting a capacitance variation inversely proportional to an integral root of a voltage applied across said first and second terminals, means coupled across said first and second terminals, including a tuned circuit for applying a relatively high frequency signal thereto and means coupled to said varactor and resonant at a lower frequency to provide across said means a frequency related to said high frequency but different therefrom by said large factor, said large factor being in excess of 100, whereby said lower frequency is relatively equal to said high frequency divided by said large factor.

The parametric divider operates with extreme efficiency and linearity with a simple circuit configuration due to the nature and operating characteristics of the varactor diode.

DETAILED DESCRIPTION OF FIGURES

Assume a carrier frequency emanating from a conversion oscillator is centered at 500 KHz. As indicated, an optimum response range for magnetic tape is between 2 KHz and 6 KHz. If one desired to divide an FM signal to be within this range, a division factor of at least 100 would be required to provide a 5 KHz signal at the output of divider 14. The division factor of 100 is quite large and of further consideration is the fact that the signal to be divided is an FM signal. Such a signal of course, contains sideband frequencies due to the modulation process. These sidebands, as is well known, contain the information characteristics of the signal. Hence, large factor division is required with linear response. Linearity is important so as not to change the characteristics of the FM signal as distortion of sideband content would seriously affect the quality of the signal recovered.

Thus, the specifications imposed upon divider 14 are considerable. In view of this, the further factor of circuit economics exist in that the divider circuit 14 should be easy to fabricate and inexpensive to implement. These features are available in the divider configuration to be described.

If divider 14 provides a large factor division of one hundred, then the FM signal available at the output of divider 14 is concentrated about 5 KHz. If the divider performs linearly, the sideband content will be unaffected.

The output of the divider 14 may be applied to an isolation amplifier as an emitter follower circuit or a preamplifier. The signal may then be recorded on a magnetic tape recorder within the above mentioned optimum range. The recorder then serves to store the divided FM signal on the magnetic tape at a carrier frequency between 2 KHz and 6 KHz. Recording of this low frequency FM signal assures that undesired amplitude modulated noise factors are eliminated as well as those noise components which, as described above, affect ac signal to noise operation. There is also no requirement for equalization as the FM signal as divided is within a narrow frequency spectrum.

The recorded signal on the magnetic tape can then be retrieved during a playback mode, by coupling the signal from the playback head of the recorder to a playback amplifier. The output from the amplifier is applied to the input of a large factor frequency multiplier, which multiplies the low frequency FM signal by the same factor the original FM signal was divided by. In this example, the factor would be 100.

Figure 1:
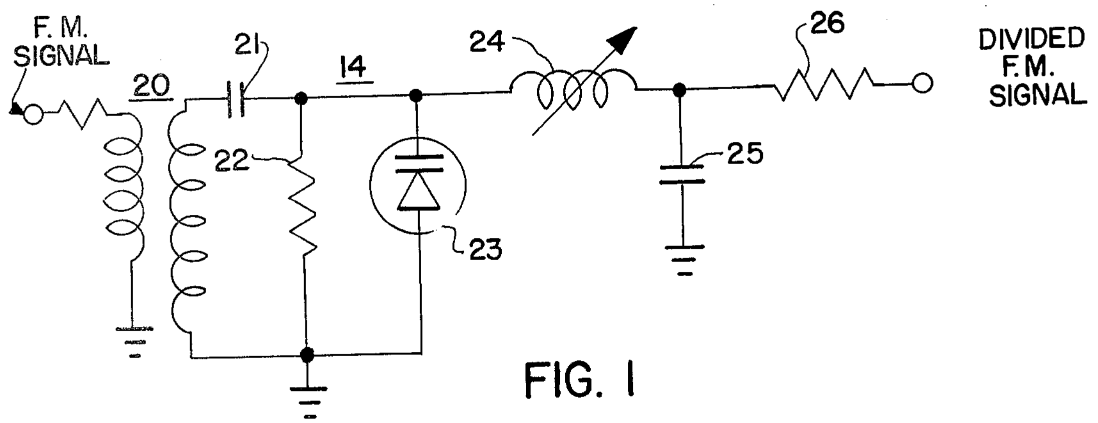
FIG. 1 is a schematic diagram of a large factor parametric frequency divider according to this invention.

Referring to FIG. 1, there is shown a schematic diagram of a large factor frequency divider circuit exhibiting linear division for an FM signal. The input FM signal is applied to the primary winding of a radio frequency transformer 20. The secondary winding has more turns than the primary to provide a voltage step up. A coupling capacitor 21 is selected to tune the secondary about the FM carrier frequency (500 KHz). A resistor 22 acts as a terminating impedance for the transformer and has one terminal coupled to a terminal of capacitor 21 and the other terminal coupled to a point of reference potential. The resistor 22 is shunted by a varactor diode 23, which as will be described, operates in a parametric mode. The diode 23 is of main concern in providing large division factors and linearity. The output circuit comprises an inductor 24 in series with a capacitor 25. The combination of inductor 24 and capacitor 23 are tuned to the desired divided signal frequency, in this example, 5 KHz. A resistor 26 provides isolation of the output for coupling to a suitable amplifier circuit.

While the exact operating mechanism of the divider shown in FIG. 1 is not clearly understood, it is believed that the diode 23 is responsible for highly efficient parametric dividing action with good linearity for all sidebands.

Figure 2:
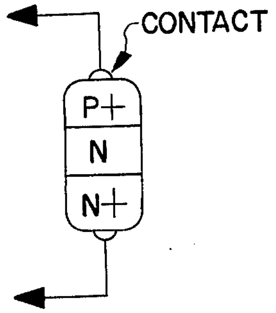
FIG. 2 is a diagramatic view of a varactor diode used in operation of the apparatus of this invention.

The varactor diode 23 utilized as shown in FIG. 2 is a P + N, N + device. A first P-region is highly doped with P type impurities such as boron, gallium, indium or aluminum, which are known as trivalent impurities and form covalent bonds with silicon or germanium. These doping techniques are known. The P + region is heavily doped with these acceptor impurities and is followed by an N region which region is lightly doped with pentavalent impurities such as phosphorus, antimony or arsenic. This N region is contiguous with an N + region which is again heavily doped as compared to the N region. The doping levels necessary to develop P + N, N + regions are known in the art for both germanium and silicon.

The varactor diode 23 is a silicon device with a zero bias capacitance of 90 picofarads and a reverse breakdown voltage of 80 volts. The diode area is about one square millimeter and the junction between the P + N, N + regions is graded because of the above noted impurity concentration to afford a graded junction characteristic whereby the capacitance varies inversely between the square and cubic root of the applied voltage.

In the configuration shown, the FM input signal acts as a pump source for the varactor diode, the capacitance of the diode 23 varies according to the voltage of the FM input signal and provides a plurality of frequency components. Since the output of the divider is tuned at the desired frequency of 5KHZ, this signal as well serves to activate the diode, thus enhancing operation at the desired output.

Due to the fact that the diode has a relatively large zero bias capacity and a graded junction, an effective division of 100 times is available at large signal output with linear behavior.

The divider shown in FIG. 1 was tested at a wide range of FM carrier frequencies and the results obtained verified unanticipated circuit operation. For example, a divider according to that shown was built using the following components:

| | |
|---|---|
| Transformer 20 | 4 turns No. 20 wire primary on powered ion core, 25 uhenry secondary |
| Capacitor 21 | 100 picofarads |
| Resistor 22 | 47,000 ohms |
| Diode 23 | Silicon P + N N + 90 picofarads with zero bias |
| Inductor 24 | Variable Miller coil (65 – 300 millihenrys) |
| Capacitor 25 | .01 microfarads |

To ascertain linearity and division ratio, a 5 MHZ carrier was applied to the primary wiring with an FM excursion of 60KHZ, representing an audio signal. A division factor of 1418 was obtained to develop at the output a 3.6KHZ signal. The signal reduced by a factor of over 1,400 times was linearly related to the high frequency FM signal. The low FM signal showed excursions of 75 cycles for the 60KHZ excursion of the high frequency FM, and was completely linear. At the reduced division factor of 100, the components were scaled and the circuit operates with greater efficiency. With the above noted signals, the input FM signal was 0.55 volts rms and the output signal after a division of 1,400 times was 0.25 volts rms. At the lower frequency division ratio, the amplitudes were approximately the same. The efficiency of operation being due to the parametric operation of the graded junction diode. It is believed that the divider may be able to provide division factors approaching 5,000 times or more.

The low frequency FM signal obtained from divider 14 is recorded on a conventional audio tape at an optimum low frequency.

This enables audio and video recording as the divider shown can linearly divide by factors of 1,000 times or more.

As indicated, the divider used to provide large dividing factors with linearity enables the system to provide low frequency FM signals with relative ease and with good economics.

I claim:

1. A frequency divider circuit for dividing an input signal of a given frequency by a large factor comprising:

a. a varactor diode having a first and second terminal and a graded junction therebetween, characterized by a first region of a heavily doped semiconductor material of a given conductivity conductor contiguous with a second region of a lighter doped semiconductor material of opposite conductivity defining a central region contiguous at one end with a third region of a semiconductor material of same conductivity as said central region and an impurity doping level approaching that of said first region, said varactor diode exhibiting a capacitance variation inversely proportional to an integral root of a voltage applied across said first and second terminals, b. means coupled across said first and second terminals, including a tuned circuit for applying a relatively high frequency signal thereto, and c. means coupled to said varactor and resonant at a lower frequency to provide across said means a frequency related to said high frequency but different therefrom by said large factor, said large factor being in excess of 100, whereby said lower frequency is relatively equal to said high frequency divided by said large factor, said high frequency signal acting as a pump source for said varactor to enable divisions by said large factors in a parametric mode.

2. The divider according to claim 1 wherein said large factor is between 100 and 2,000.

3. The divider according to claim 1 wherein said integral root is between 1 and 4.

4. The frequency divider according to claim 1 wherein said varactor diode is a P+,N,N+ device.

5. The frequency divider according to claim 1 wherein said large division factor is 1418.

6. The frequency divider according to claim 1 wherein said input signal is a frequency modulated (FM) signal.

7. The frequency divider according to claim 6 wherein said lower frequency signal as divided by said large factor is an FM signal linearly related to said input signal.

8. The frequency divider according to claim 1 wherein said varactor diode is a silicon device with a zero bias capacitance of about 90 picofarads.

* * * * *